(12) United States Patent
Yalvac et al.

(10) Patent No.: US 7,781,510 B2
(45) Date of Patent: *Aug. 24, 2010

(54) HIGHLY FILLED POLYMER COMPOSITIONS

(75) Inventors: Selim Yalvac, Pearland, TX (US); Brad M. Moncla, Lake Jackson, TX (US); Michael J. Levinson, Midland, MI (US); Teresa P. Karjala, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/945,340

(22) Filed: Nov. 27, 2007

(65) Prior Publication Data

US 2008/0139714 A1 Jun. 12, 2008

Related U.S. Application Data

(63) Continuation of application No. 10/529,528, filed as application No. PCT/US03/33192 on Oct. 17, 2003, now Pat. No. 7,335,696.

(60) Provisional application No. 60/419,285, filed on Oct. 17, 2002.

(51) Int. Cl.
*C08J 8/22* (2006.01)

(52) U.S. Cl. .................. 524/451; 524/147; 524/582; 524/570; 524/427; 524/432

(58) Field of Classification Search ............... 524/451, 524/147, 582, 570, 427, 432
See application file for complete search history.

(56) References Cited

U.S. PATENT DOCUMENTS

| | | | |
|---|---|---|---|
| 4,494,953 A | 1/1985 | Bugaut et al. |
| 4,874,880 A | 10/1989 | Miya et al. |
| 5,023,388 A | 6/1991 | Luker et al. |
| 5,044,438 A | 9/1991 | Young |
| 5,057,475 A | 10/1991 | Canich et al. |
| 5,084,802 A | 1/1992 | Nguyenngoc |
| 5,096,867 A | 3/1992 | Canich |
| 5,132,380 A | 7/1992 | Stevens et al. |
| 5,153,157 A | 10/1992 | Hlatky et al. |
| 5,198,401 A | 3/1993 | Turner et al. |
| 5,218,071 A | 6/1993 | Tsutsui et al. |
| 5,272,236 A | 12/1993 | Lai et al. |
| 5,278,272 A | 1/1994 | Lai et al. |
| 5,296,433 A | 3/1994 | Siedle et al. |
| 5,324,800 A | 6/1994 | Welborn, Jr. et al. |
| 5,408,017 A | 4/1995 | Turner et al. |
| 5,427,991 A | 6/1995 | Turner |
| 5,494,953 A * | 2/1996 | Rigosi et al. ............. 524/225 |
| 5,504,049 A | 4/1996 | Crowther et al. |
| 5,576,374 A | 11/1996 | Betso et al. |
| 5,599,761 A | 2/1997 | Turner |
| 5,616,664 A | 4/1997 | Timmers et al. |
| 5,621,127 A | 4/1997 | Langhauser et al. |
| 5,625,087 A | 4/1997 | Devore et al. |
| 5,703,187 A | 12/1997 | Timmers |
| 5,703,257 A | 12/1997 | Rosen et al. |
| 5,710,224 A | 1/1998 | Alt et al. |
| 5,723,705 A | 3/1998 | Herrmann et al. |
| 5,728,855 A | 3/1998 | Smith et al. |
| 5,731,253 A | 3/1998 | Sangokoya |
| 5,763,516 A | 6/1998 | Godfrey |
| 5,767,208 A | 6/1998 | Turner et al. |
| 5,804,661 A | 9/1998 | Davis et al. |
| 5,883,204 A | 3/1999 | Spencer et al. |
| 5,907,021 A | 5/1999 | Turner et al. |
| 5,962,714 A | 10/1999 | McCullough et al. |
| 5,965,677 A | 10/1999 | Stephan et al. |
| 5,965,756 A | 10/1999 | McAdon et al. |
| 5,972,822 A | 10/1999 | Timmers et al. |
| 6,008,262 A | 12/1999 | McKay et al. |
| 6,013,819 A | 1/2000 | Stevens et al. |
| 6,015,868 A | 1/2000 | Nickias et al. |
| 6,054,544 A | 4/2000 | Finlayson et al. |
| 6,074,977 A | 6/2000 | Rosen et al. |
| 6,107,430 A | 8/2000 | Dubois et al. |
| 6,120,887 A | 9/2000 | Werenicz et al. |
| 6,150,297 A | 11/2000 | Campbell, Jr. et al. |
| 6,221,448 B1 | 4/2001 | Baetzold et al. |
| 6,268,444 B1 | 7/2001 | Klosin et al. |
| 6,300,398 B1 | 10/2001 | Jialanella et al. |

(Continued)

FOREIGN PATENT DOCUMENTS

EP          0277003 A1      8/1988

(Continued)

OTHER PUBLICATIONS

Joseph A. Randosta & Nikhil C. Trivedi, Handbook of Fillers and Reinforcements for Plastics, 1978, p. 160, Harry S. Katz & John V. Milewski eds. Van Nostrand Reinhold Co., New York.

(Continued)

*Primary Examiner*—Robert D. Harlan

(57) ABSTRACT

This invention pertains to highly filled polymer compositions comprising a low molecular weight ethylene and/or alpha olefin homopolymers and copolymers, or blends therefrom, filled with high concentrations of fillers or additives. Examples of such fillers or additives include fire retardants, talc, ceramic manufacturing agents, color concentrates, crosslinking agents, and blowing agents. Because of the low crystallinity (and therefore high percentage of amorphous phase) and low viscosities of the base polymers, highly processable compositions can be formed containing even if containing relatively high loadings of fillers or additives. Such highly filled compositions are thus ideally suited as concentrates or masterbatch formulations for a variety of different compounding applications.

16 Claims, No Drawings

U.S. PATENT DOCUMENTS

| | | | |
|---|---|---|---|
| 6,319,979 B1 | 11/2001 | Dubois et al. | |
| 6,323,285 B1 | 11/2001 | Johnston et al. | |
| 6,335,410 B1 | 1/2002 | Finlayson et al. | |
| 6,339,112 B1 | 1/2002 | Kauffman et al. | |
| 6,455,771 B1 | 9/2002 | Han et al. | |
| 6,462,154 B1 | 10/2002 | Naganuma et al. | |
| 6,515,155 B1 | 2/2003 | Klosin et al. | |
| 6,534,572 B1 | 3/2003 | Ahmed et al. | |
| 6,573,315 B1 | 6/2003 | Colvin et al. | |
| 6,582,829 B1 | 6/2003 | Quinn et al. | |
| 6,590,006 B2 | 7/2003 | Park et al. | |
| 6,613,921 B2 | 9/2003 | Campbell, Jr. et al. | |
| 6,723,810 B2 | 4/2004 | Finlayson et al. | |
| 7,144,925 B2 | 12/2006 | Burgun et al. | |
| 7,199,180 B1 | 4/2007 | Simmons et al. | |
| 7,335,696 B2 * | 2/2008 | Yalvac et al. | 524/451 |
| 7,531,601 B2 | 5/2009 | Karjala et al. | |
| 2006/0025640 A1 | 2/2006 | Karjala et al. | |
| 2008/0058437 A1 | 3/2008 | Burgun et al. | |
| 2008/0139714 A1 | 6/2008 | Yalvac et al. | |
| 2009/0105407 A1 | 4/2009 | Karjala et al. | |

FOREIGN PATENT DOCUMENTS

| | | |
|---|---|---|
| EP | 0468537 B1 | 1/1992 |
| EP | 0468651 B1 | 1/1992 |
| EP | 0514828 B1 | 11/1992 |
| EP | 0520732 B1 | 12/1992 |
| EP | 0593859 A1 | 4/1994 |
| EP | 0949278 A2 | 10/1999 |
| EP | 0949279 A2 | 10/1999 |
| EP | 1063244 A2 | 12/2000 |
| JP | 60 058447 | 4/1985 |
| WO | WO-8805792 | 8/1988 |
| WO | WO-8805793 | 8/1988 |
| WO | WO-9007526 | 7/1990 |
| WO | WO-9319104 | 9/1993 |
| WO | WO-9321238 | 10/1993 |
| WO | WO-9321242 | 10/1993 |
| WO | WO-9325590 | 12/1993 |
| WO | WO-9400500 | 1/1994 |
| WO | WO-9403506 | 2/1994 |
| WO | WO-9417112 | 8/1994 |
| WO | WO-95/00526 | 1/1995 |
| WO | WO-9613530 | 5/1996 |
| WO | WO-9623010 | 8/1996 |
| WO | WO-9722635 | 6/1997 |
| WO | WO-9742241 | 11/1997 |
| WO | WO-9800244 | 1/1998 |
| WO | WO-9841529 | 9/1998 |
| WO | WO-9850392 | 11/1998 |
| WO | WO-9914250 | 3/1999 |
| WO | WO-0142315 A1 | 6/2001 |
| WO | WO-03/027157 A1 | 4/2003 |
| WO | WO-2004/035680 A1 | 4/2004 |

OTHER PUBLICATIONS

Scollard, et al., J. Am. Chem. Soc, 1996, p. 10008-10009, vol. 118.
Wang, et al., Organometallics, 1998, p. 3149-3151, vol. 17.
Younkin, et al., Science, 2000, p. 460-462, vol. 287.
Chen and Marks, Chem. Rev., 2000, p. 1391-1434, vol. 100.
Alt and Koppl, Chem. Rev., 2000, p. 1205-1221, vol. 100.
Resconi, et al., Chem. Rev., 2000, p. 1253-1345, vol. 100.
Ittel, et al., Chem. Rev., 2000, p. 1169-1203, vol. 100.
Coates, Chem. Rev., 2000, p. 1223-1251, vol. 100.
J. Chem. Soc. Chem. Comm., 1993, p. 383-384.
Lambert, J.B., et al., Organometallics, 1994, p. 2430-2443, vol. 13.
Toshiyuki Tsutsui, Mamoru Kioka, Norio Kashiwa, inventors; Mitsui Petrochemical Industries, Ltd., assignee; Production of Process of Ethylene Wax. JP Application No. S60-078462. Apr. 5, 1985.
Tsutsui, Toyoda, Kashiwa, inventors; Misui Petrochemical Industries, Ltd, assignee; Ethylenic Random Copolymer Wax and Process for Production Thereof.JP Application No. S60-269416. Dec. 2, 1985.
JP SHO 60-58447, Apr. 4, 1995, (English Translation) Thermoplastic Resin Composition Containing an Inorganic Filler. Mitsui Sekiyu Kagaku K.K.

* cited by examiner

HIGHLY FILLED POLYMER COMPOSITIONS

This application is a continuation of U.S. application Ser. No. 10/529,528, filed on Mar. 29, 2005, now U.S. Pat. No. 7,335,696, which is a U.S. National Stage Application, under 35 U.S.C. §371, of International Application No. PCT/US03/33192, filed on Oct. 17, 2003, which claims the benefit of U.S. Provisional Application No. 60/419,285, filed on Oct. 17, 2002; each application is fully incorporated herein by reference.

This invention pertains to polymer compositions comprising a low molecular weight ethylene and/or alpha olefin homopolymer or copolymer, or blends therefrom, which are filled with high concentrations of fillers or additives. Examples of such fillers or additives include fire retardants, talc, ceramic manufacturing agents, color concentrates, crosslinking agents, and blowing agents. Because of the low crystallinity and low viscosities of the base polymers, highly processable compositions can be formed even when containing relatively high loadings of fillers or additives. Such highly filled compositions are thus ideally suited as concentrates or masterbatch formulations for a variety of different compounding applications.

Additives in polymer composition are used to modify the properties of the bulk polymer for a large number of applications. For instance, fillers are frequently used to improve the stiffness of polymer compositions, or to decrease the coefficient of linear thermal expansion, or to decrease the overall cost of the polymer composition. However, such fillers are well known to simultaneously decrease impact performance or toughness of the resultant composition. For example, Joseph A. Randosta & Nikhil C. Trivedi (in Talc, published in Handbook of Fillers and Reinforcements for Plastics, p 160, Harry S. Katz & John V. Milewski eds. Van Nostrand Reinhold Co., New York 1978), disclose that the impact performance of polymeric materials is generally decreased by the presence of rigid fillers, especially below the glass transition temperature (Tg) of the matrix material, due to the fillers action as a "stress concentrator".

For many applications, the filler is typically incorporated into the bulk polymer at levels ranging from 1 to 50 weight percent of the formulation, depending upon the filler density. Typical thermoplastic formulations (for example, polypropylene, an elastomeric rubber and talc), even at filler loadings of about 20 percent, have very poor impact performance and do not function well in uses such as automotive facia.

U.S. Pat. No. 5,576,374 discloses filled thermoplastic olefinic compositions which have good low temperature impact performance and modulus comprising a thermoplastic resin, at least one substantially linear ethylene/α-olefin interpolymer, and at least one filler. The filled thermoplastic olefinic compositions are said to be useful as automotive bumpers, facia, wheel covers and grilles and freezer containers.

Fillers or additives are typically introduced into the bulk polymer by way of a masterbatch, and further improvements in filler or additive performance as well as cost improvements could be derived from the use of masterbatches containing higher loadings of the filler or additive. Also improved dispersion of the additive or filler in the bulk resin, as well as lower compounding and let down energy costs, could be derived if such a high filled polymer masterbatch would also be more processable.

In one aspect, the present invention relates to a filled composition comprising one or more homogeneous, low crystallinity, low viscosity ethylene/alpha olefin polymers (or blends therefrom) used as the base polymer, and a high concentration of one or more fillers or additives. The excellent processability of these highly filled compositions is comparable to that of many non-filled bulk resins used in industrial applications and therefore they can be co-extruded with good dispersion.

In another aspect, the present invention relates to a fabricated article comprising such a highly filled polymer composition.

In yet another aspect, the present invention relates to a multilayered structure wherein at least one layer comprises such a filled polymer composition.

DEFINITIONS

The terms "additive" and "filler" are used interchangeably herein.

The term "base polymer" as used herein means the polymer composition into which a filler or additive is mixed during the preliminary compounding step to form the highly filled polymer compositions of the present invention.

The term "masterbatch" is used herein interchangeably with the term "highly filled polymer composition" and means a mixture of the base polymer and a high concentration of additive or filler.

The term "bulk polymer" as used herein is the resin with which the highly filled polymer compositions of the present invention are mixed to form a final resin formulation.

The term "compounding step" as used herein means the processing step during which the base polymer and the additive or filler are mixed to form the highly filled polymer compositions of the present invention.

The term "let down" as used herein means the processing step during which the highly filled polymer composition of the present invention and the bulk polymer are mixed to form the final resin formulation.

The term "interpolymer" is used herein to indicate a polymer wherein at least two different monomers are polymerized to make the interpolymer.

The term "homogeneous polymer" means that in an ethylene/α-olefin interpolymer (1) the α-olefin comonomer is randomly distributed within a given polymer molecule, (2) substantially all of the polymer molecules have the same ethylene-to-comonomer ratio, and (3) the interpolymer essentially lacks a measurable high density (crystalline) polymer fraction as measured by known fractionation techniques such as, for example, a method that involves polymer fractional elutions as a function of temperature. Examples of homogeneous polymers include the substantially linear polymers defined as in U.S. Pat. No. 5,272,236 (Lai et al.), in U.S. Pat. No. 5,278,272, U.S. Pat. No. 6,054,544 and U.S. Pat. No. 6,335,410 B1.

Fillers, including those used as active and passive flame retardant additives (aluminum trihydrate, magnesium hydroxide, and calcium carbonate) when incorporated into polymers significantly lower their processability. For flame retardant applications, such as those meeting UL-94 (V-0), filler levels of 50-65 wt. percent are required, depending on such parameters as the choice of base resin. Such high levels of filler in a bulk polymer are more accurately introduced using a highly filled polymer composition comprising an additive and a base polymer, which may or may not be the same polymer as the bulk polymer. Such a highly filled composition is often known as a "masterbatch". The term "masterbatch" as used herein, means a mixture which is mixed or compounded such that it contains a high filler or additive concentration, for example mixtures of a polymer and a high concentration of carbon black, or a color pigment or a flame retardant. This masterbatch, which is thus more accurately metered than the filler or additive itself, is then used to apportion said filler or additive accurately into a much larger amount of the bulk plastic, rubber or elastomer. This subsequent extrusion or other mixing process is known as the "let down process".

The composition of the masterbatch is crucial in that its use must result, not only in accurate metering of the additive into the bulk polymer, but also good dispersion of the filler or additive throughout the final polymer composition. It is also important that the masterbatch not only comprise a high concentration of additive, but also that it be easily processable not only during the mixing process with the bulk polymer (the let down process) but also during the actual mixing process of the additive and base polymers, that is, the compounding step.

Typically, filler contents significantly in excess of 70 wt. percent are required to make filler masterbatches which can be let down to a final content of 50 wt. percent filler along with appropriate bulk resins for specific applications. The amount of filler that can incorporated into the polymer is limited only by the molecular structure of the filler-containing composition and/or the extent that the filler does not interfere with the other enhancements brought by the polymer. For instance, a typical binder for injection molding ceramics can accept about 50 percent by weight solids. This loading should be as high as possible to minimize shrinking, and the higher the better. Similarly, carbon black is a difficult filler/color additive to blend in at or above 50 percent by weight solids level. The upper limit for filler or additive loading is determined by the engineer's ability to process the filled material.

Filler contents greater than 70 wt. percent are generally difficult to prepare owing to the low processability of the system, the compatibility of the filler with the chosen polymer carrier, and the subsequent physical integrity of pellets made with high filler content systems.

We have surprisingly found that the low crystallinities and low viscosities of certain base polymers allow them to be loaded with high levels of fillers or additives (for example, talc, carbon black, silica, magnesium hydroxide, calcium carbonate, aluminum trihydrate, antioxidants for example, Irganox 1010, a hindered phenolic; Irgafos 168, a phosphite; etc., cling additives (for example, polyisobutylene), antiblock additives, colorants, pigments, waxes, nucleating agents, extender oils, flame retardants, and tackifers.

In addition, the compositions of the present invention combine high filler concentrations with good processability. Solids levels of 70 wt percent, 80 wt percent or more based on the combined weight of the composition and filler may be achieved and the materials are processable during the extrusion process at torque levels and/or melt temperatures below those observed for compositions of the same filler content but comprising base resins other than those used in the present invention.

Base Polymer Component

The homogeneous low crystallinity, low viscosity ethylene and/or alpha olefin homopolymers or interpolymers used as the base polymer for the filled compositions of the present invention may be interpolymers of ethylene and at least one suitable comonomer. Preferred comonomers include $C_{3-20}$ α-olefins (especially propylene, isobutylene, 1-butene, 1-pentene, 1-hexene, 3-methyl-1-pentene, 4-methyl-1-pentene, 1-hexene, and 1-octene), $C_{4-40}$ non-conjugated dienes, styrene, alkyl-substituted styrene, tetrafluoroethylene, vinylbenzocyclobutene, 1,4-hexadiene, naphthenics (for example, cyclopentene, cyclohexene and cyclooctene), and mixtures thereof. Most preferred are propylene and 1-octene.

The polymers may also be $C_3$-$C_{20}$ alpha olefin homopolymers or copolymers such as polypropylene, or propylene/ethylene, or propylene $C_4$-$C_{20}$ alpha-olefin copolymers.

When ethylene propylene diene terpolymers (EPDM's) are prepared, the dienes are typically non-conjugated dienes having from 6 to 15 carbon atoms. Representative examples of suitable non-conjugated dienes that may be used to prepare the terpolymers include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; 5-cyclohexylidene-2-norbornene; etc.

The preferred dienes are selected from the group consisting of 1,4-hexadiene; dicyclopentadiene; 5-ethylidene-2-norbornene; 5-methylene-2-norbornene; 7-methyl-1,6 octadiene; 4-vinylcyclohexene; etc. One preferred conjugated diene which may be employed is piperylene.

Most preferred monomers are ethylene, mixtures of ethylene, propylene and ethylidenenorbornene, or mixtures of ethylene and a $C_{3-8}$ α-olefin, and most especially propylene and 1-octene.

The homogeneous, low crystallinity, low viscosity ethylene/alpha olefin polymers used as the base polymer for the filled compositions of the present invention, may be prepared using the constrained geometry catalysts disclosed in U.S. Pat. No. 5,064,802, U.S. Pat. No. 5,132,380, U.S. Pat. No. 5,703,187, U.S. Pat. No. 6,034,021, EP 0 468 651, EP 0 514 828, WO 93/19104, and WO 95/00526. Another suitable class of catalysts is the metallocene catalysts disclosed in U.S. Pat. No. 5,044,438; U.S. Pat. No. 5,057,475; U.S. Pat. No. 5,096,867; and U.S. Pat. No. 5,324,800. It is noted that constrained geometry catalysts may be considered as metallocene catalysts, and both are sometimes referred to in the art as single-site catalysts.

For example, catalysts may be selected from the metal coordination complexes corresponding to the formula:

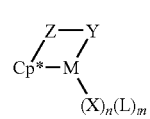

Formula I wherein: M is a metal of group 3, 4-10, or the lanthanide series of the periodic table of the elements; Cp* is a cyclopentadienyl or substituted cyclopentadienyl group bound in an $\eta^5$ bonding mode to M; Z is a moiety comprising boron, or a member of group 14 of the periodic table of the elements, and optionally sulfur or oxygen, the moiety having up to 40 non-hydrogen atoms, and optionally Cp* and Z together form a fused ring system; X independently each occurrence is an anionic ligand group, said X having up to 30 non-hydrogen atoms; n is 2 less than the valence of M when Y is anionic, or 1 less than the valence of M when Y is neutral; L independently each occurrence is a neutral Lewis base ligand group, said L having up to 30 non-hydrogen atoms; m is 0, 1, 2, 3, or 4; and Y is an anionic or neutral ligand group bonded to Z and M comprising nitrogen, phosphorus, oxygen or sulfur and having up to 40 non-hydrogen atoms, optionally Y and Z together form a fused ring system.

Suitable catalysts may also be selected from the metal coordination complex corresponds to the formula:

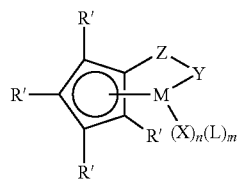

Formula II wherein R' each occurrence is independently selected from the group consisting of hydrogen, alkyl, aryl, silyl, germyl, cyano, halo and combinations thereof having up to 20 non-hydrogen atoms; X each occurrence independently is selected from the group consisting of hydride, halo, alkyl, aryl, silyl, germyl, aryloxy, alkoxy, amide, siloxy, and combinations thereof having up to 20 non-hydrogen atoms; L independently each occurrence is a neural Lewis base ligand having up to 30 non-hydrogen atoms; Y is —O—, —S—, —NR*—, —PR*—, or a neutral two electron donor ligand selected from the group consisting of OR*, SR*, NR*$_2$, PR*$_2$; M, n, and m are as previously defined; and Z is SIR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$; wherein: R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system.

It should be noted that whereas formula I and the following formulas indicate a monomeric structure for the catalysts, the complex may exist as a dimer or higher oligomer.

Further preferably, at least one of R', Z, or R* is an electron donating moiety. Thus, highly preferably Y is a nitrogen or phosphorus containing group corresponding to the formula —N(R"")— or —P(R"")—, wherein R"" is $C_{1-10}$ alkyl or aryl, that is, an amido or phosphido group.

Additional catalysts may be selected from the amidosilane- or amidoalkanediyl-compounds corresponding to the formula:

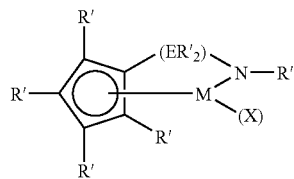

Formula III wherein: M is titanium, zirconium or hafnium, bound in an $\eta^5$ bonding mode to the cyclopentadienyl group; R' each occurrence is independently selected from the group consisting of hydrogen, silyl, alkyl, aryl and combinations thereof having up to 10 carbon or silicon atoms; E is silicon or carbon; X independently each occurrence is hydride, halo, alkyl, aryl, aryloxy or alkoxy of up to 10 carbons; m is 1 or 2; and n is 1 or 2 depending on the valence of M.

Examples of the above metal coordination compounds include, but are not limited to, compounds in which the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include, but are not limited to, (tert-butylamido)(tetramethyl-$\eta^5$-cyclopentadienyl)-1,2-ethanediylzirconium dimethyl, (tert-butylamido) (tetramethyl-$\eta^5$-cyclo penta dienyl)-1,2-ethanediyltitanium dimethyl, (methylamido) (tetramethyl-$\eta^5$-cyclopenta dienyl)-1,2-ethanediylzirconium dichloride, (methylamido) (tetramethyl-$\eta^5$-eyelopenta dienyl)-1,2-ethane diyltitanium dichloride, (ethylamido)(tetramethyl-$\eta^5$-cyclopentadienyl)-methylenetitanium methylenetitanium dichloro, (tertbutylamido)diphenyl(tetramethyl-$\eta^5$-cyclopentadienyl)-silane zirconium dibenzyl, (benzylamido)dimethyl-(tetramethyl-$\eta^5$-cyclopentadienyl) ilanetitaniumdichloride, and phenylphosphido)dimethyl(tetramethyl-$\eta^5$-cyclopentadienyl) silane zirconium dibenzyl. Another suitable class of catalysts is substituted indenyl containing metal complexes as disclosed in U.S. Pat. No. 5,965,756 and U.S. Pat. No. 6,015,868. Other preferred catalysts are disclosed in U.S. Pat. No. 5,616,664 and copending applications: U.S. application Ser. No. 09/230,185; and Ser. No. 09/715,380, and U.S. Provisional Application Ser. No. 60/215,456; Ser. No. 60/170,175, and Ser. No. 60/393,862. These catalysts tend to have a higher molecular weight capability.

One class of the above catalysts is the indenyl containing metal wherein:

Formula IV

M is titanium, zirconium or hafnium in the +2, +3 or +4 formal oxidation state;

A' is a substituted indenyl group substituted in at least the 2 or 3 position with a group selected from hydrocarbyl, fluoro-substituted hydrocarbyl, hydrocarbyloxy-substituted hydrocarbyl, dialkylamino-substituted hydrocarbyl, silyl, germyl and mixtures thereof, the group containing up to 40 non-hydrogen atoms, and the A' further being covalently bonded to M by means of a divalent Z group; Z is a divalent moiety bound to both A' and M via π-bonds, the Z comprising boron, or a member of Group 14 of the Periodic Table of the Elements, and also comprising nitrogen, phosphorus, sulfur or oxygen; X is an anionic or dianionic ligand group having up to 60 atoms exclusive of the class of ligands that are cyclic, delocalized, n-bound ligand groups; X' independently each occurrence is a neutral Lewis base, having up to 20 atoms; p is 0, 1 or 2, and is two less than the formal oxidation state of M, with the proviso that when X is a dianionic ligand group, p is 1; and q is 0, 1 or 2.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material, preferably a neutral Lewis base, especially a trihydrocarbylamine, trihydrocarbylphosphine, or halogenated derivative thereof.

Preferred catalysts are complexes corresponding to the formula:

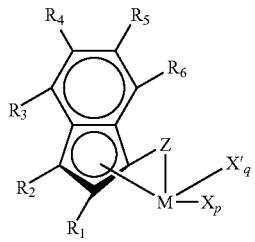

Formula V wherein $R_1$ and $R_2$ independently are groups selected from hydrogen, hydrocarbyl, perfluoro substituted hydrocarbyl, silyl, germyl and mixtures thereof, the group containing up to 20 non-hydrogen atoms, with the proviso that at least one of $R_1$ or $R_2$ is not hydrogen; $R_3$, $R_4$, $R_5$, and $R_6$ independently are groups selected from hydrogen, hydrocarbyl, perfluoro substituted hydrocarbyl, silyl, germyl and mixtures thereof, the group containing up to 20 non-hydrogen atoms; M is titanium, zirconium or hafnium; Z is a divalent moiety comprising boron, or a member of Group 14 of the Periodic Table of the Elements, and also comprising nitrogen, phosphorus, sulfur or oxygen, the moiety having up to 60 non-hydrogen atoms; p is 0, 1 or 2; q is zero or one; with the proviso that: when p is 2, q is zero, M is in the +4 formal oxidation state, and X is an anionic ligand selected from the group consisting of halide, hydrocarbyl, hydrocarbyloxy, di(hydrocarbyl) amido, di(hydrocarbyl)phosphido, hydrocarbyl sulfido, and silyl groups, as well as halo-, di(hydrocarbyl)amino-, hydrocarbyloxy- and di(hydrocarbyl)phosphino-substituted derivatives thereof, the X group having up to 20 non-hydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or non-conjugated diene, optionally substituted with one or more hydrocarbyl groups, the X' having up to 40 carbon atoms and forming a π-complex with M.

More preferred catalysts are complexes corresponding to the formula:

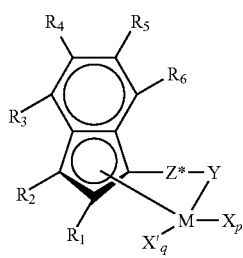

Formula VI wherein: $R_1$ and $R_2$ are hydrogen or $C_{1-6}$ alkyl, with the proviso that at least one of $R_1$ or $R_2$ is not hydrogen; $R_3$, $R_4$, $R_5$, and $R_6$ independently are hydrogen or $C_{1-6}$ alkyl; M is titanium; Y is —O—, —S—, —NR*—, —PR*—; Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$; R* each occurrence is independently hydrogen, or a member selected from hydrocarbyl, hydrocarbyloxy, silyl, halogenated alkyl, halogenated aryl, and combinations thereof, the R* having up to 20 non-hydrogen atoms, and optionally, two R* groups from Z (when R* is not hydrogen), or an R* group from Z and an R* group from Y form a ring system; p is 0, 1 or 2; q is zero or one; with the proviso that: when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 1,4-butadienyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

Other catalysts, cocatalysts, catalyst systems, and activating techniques which may be used in the practice of the invention disclosed herein may include those disclosed in; WO 96/23010, published on Aug. 1, 1996, WO 99/14250, published Mar. 25, 1999, WO 98/41529, published Sep. 24, 1998, WO 97/42241, published Nov. 13, 1997, WO 97/42241, published Nov. 13, 1997, those disclosed by Scollard, et al., in J. Am. Chem. Soc 1996, 118, 10008-10009, EP 0 468 537 B1, published Nov. 13, 1996, WO 97/22635, published Jun. 26, 1997, EP 0 949 278 A2, published Oct. 13, 1999; EP 0 949 279 A2, published Oct. 13, 1999; EP 1 063 244 A2, published Dec. 27, 2000; U.S. Pat. No. 5,408,017; U.S. Pat. No. 5,767,208; U.S. Pat. No. 5,907,021; WO 88/05792, published Aug. 11, 1988; WO 88/05793, published Aug. 11, 1988; WO 93/25590, published Dec. 23, 1993; U.S. Pat. No. 5,599,761; U.S. Pat. No. 5,218,071; WO 90/07526, published Jul. 12, 1990; U.S. Pat. No. 5,972,822; U.S. Pat. No. 6,074,977; U.S. Pat. No. 6,013,819; U.S. Pat. No. 5,296,433; U.S. Pat. No. 4,874,880; U.S. Pat. No. 5,198,401; U.S. Pat. No. 5,621,127; U.S. Pat. No. 5,703,257; U.S. Pat. No. 5,728,855; U.S. Pat. No. 5,731,253; U.S. Pat. No. 5,710,224; U.S. Pat. No. 5,883,204; U.S. Pat. No. 5,504,049; U.S. Pat. No. 5,962,714; U.S. Pat. No. 5,965,677; U.S. Pat. No. 5,427,991; WO 93/21238, published Oct. 28, 1993; WO 94/03506, published Feb. 17, 1994; WO 93/21242, published Oct. 28, 1993; WO 94/00500, published Jan. 6, 1994, WO 96/00244, published Jan. 4, 1996, WO 98/50392, published Nov. 12, 1998; Wang, et al., Organometallics 1998, 17, 3149-3151; Younkin, et al., Science 2000, 287, 460-462, Chen and Marks, Chem. Rev. 2000, 100, 1391-1434, Alt and Koppl, Chem. Rev. 2000, 100, 1205-1221; Resconi, et al., Chem. Rev. 2000, 100, 1253-1345; Ittel, et al., ChemRev. 2000, 100, 1169-1203; Coates, Chem. Rev., 2000, 100, 1223-1251; WO 96/13530, published May 9, 1996. Also useful are those catalysts, cocatalysts, and catalyst systems disclosed in U.S. Ser. No. 09/230,185, filed Jan. 15, 1999; U.S. Pat. No. 5,965,756; U.S. Pat. No. 6,150,297; U.S. Ser. No. 09/715,380, filed Nov. 17, 2000. In addition, methods for preparing the aforementioned catalysts are described, for example, in U.S. Pat. No. 6,015,868.

The above-described catalysts may be rendered catalytically active by combination with an activating cocatalyst or by use of an activating technique. Suitable activating cocatalysts for use herein include, but are not limited to, polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 30 carbons in each hydrocarbyl or halogenated hydrocarbyl group, more especially perfluorinated tri(aryl)boron and perfluorinated tri(aryl)aluminum compounds, mixtures of fluoro-substituted(aryl)boron compounds with alkyl-containing aluminum compounds, especially mixtures of tris(pentafluorophenyl)borane with trialkylaluminum or mixtures of tris(pentafluorophenyl)borane with alkylalumoxanes, more especially mixtures of tris(pentafluorophenyl)borane with methylalumoxane and mixtures of tris(pentafluorophenyl)borane with methylalumoxane modified with a percentage of higher alkyl groups (MMAO), and most especially tris(pentafluorophenyl)borane and tris(pentafluorophenyl)-aluminum; non-polymeric, compatible, non-coordinating, ion forming compounds (including the use of such compounds under oxidizing conditions), especially the use of ammonium-, phosphonium-, oxonium-, carbonium-, sylium- or sulfonium-salts of compatible, non-coordinating anions, or ferrocenium salts of compatible, non-coordinating anions; bulk electrolysis and combinations of the foregoing activating cocatalysts and techniques. The foregoing activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992).

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane are especially desirable activating cocatalysts. It has been observed that the most efficient catalyst activation using such a combination of tris(pentafluoro-phenyl)borane/alumoxane mixture occurs at reduced levels of alumoxane. Preferred molar ratios of Group 4 metal complex:tris(pentafluoro-phenylborane:alumoxane are from 1:1:1 to 1:5:10, more preferably from 1:1:1 to 1:3:5. Such efficient use of lower levels of alumoxane allows for the production of olefin polymers with high catalytic efficiencies using less of the expensive alumoxane cocatalyst. Additionally, polymers with lower levels of aluminum residue, and hence greater clarity, are obtained.

Suitable ion forming compounds useful as cocatalysts in some embodiments of the invention comprise a cation which is a Bronsted acid capable of donating a proton, and a compatible, non-coordinating anion, $A^-$. As used herein, the term "non-coordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A non-coordinating anion specifically refers to an anion which, when functioning as a charge balancing anion in a cationic metal complex, does not transfer an anionic substituent or fragment thereof to the cation thereby forming neutral complexes during the time which would substantially interfere with the intended use of the cationic metal complex as a catalyst. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, the anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, known in the art and many, particularly such compounds containing a single boron atom in the anion portion, are available commercially.

Preferably such cocatalysts may be represented by the following general formula:

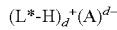  Formula VII wherein $L^*$ is a neutral Lewis base; $(L^*-H)+$ is a Bronsted acid; $A^{d-}$ is an anion having a charge of d-, and d is an integer from 1 to 3. More preferably $A^{d-}$ corresponds to the formula: $[M'Q_4]^-$, wherein M' is boron or aluminum in the +3 formal oxidation state; and Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), the Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

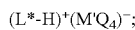  Formula VIII wherein $L^*$ is as previously defined; M' is boron or aluminum in a formal oxidation state of 3; and Q is a hydrocarbyl-, hydrocarbyloxy-, fluorinated hydrocarbyl-, fluorinated hydrocarbyloxy-, or fluorinated silylhydrocarbyl-group of up to 20 non-hydrogen atoms, with the proviso that in not more than one occasion is Q hydrocarbyl. Most preferably, Q in each occurrence is a fluorinated aryl group, especially a pentafluorophenyl group. Preferred $(L^*-H)^+$ cations are N,N-dimethylanilinium, N,N-di(octadecyl)anilinium, di(octadecyl)methylammonium, methylbis(hydrogenated tallowyl)ammonium, and tributylammonium.

Illustrative, but not limiting, examples of boron compounds which may be used as an activating cocatalyst are tri-substituted ammonium salts such as: trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-dimethylanilinium n-butyltris(pentafluorophenyl)borate; N,N-dimethylanilinium benzyltris(pentafluorophenyl)borate; N,N-dimethylanilinium tetrakis(4-(t-butyldimethylsilyl)-2,3,5,6-tetrafluorophenyl) borate; N,N-dimethylanilinium tetrakis(4-(triisopropylsilyl)-2,3,5,6-tetrafluorophenyl)borate; N,N-dimethylanilinium pentafluoro phenoxytris (pentafluorophenyl)borate; N,N-diethylanilinium tetrakis (pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl) borate; tripropylammonium tetrakis(2,3,4,6-tetrafluorophenyl)borate; tri(n-butyl)ammonium tetrakis(2,3,4,6-tetrafluorophenyl)borate, dimethyl(t-butyl)ammonium tetrakis(2,3,4,6-tetra fluorophenyl)borate; N,N-dimethylanilinium tetrakis(2,3,4,6-tetrafluorophenyl)borate; N,N-diethylanilinium tetrakis(2,3,4,6-tetrafluorophenyl)borate; and N,N-dimethyl-2,4,6-trimethylanilinium tetrakis(2,3,4,6-tetrafluorophenyl)borate; dialkyl ammonium salts such as: di-(i-propyl)ammonium tetrakis(pentafluorophenyl)borate, and dicyclohexylammonium tetrakis(pentafluorophenyl)borate; tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate; di-substituted oxonium salts such as: diphenyloxonium tetrakis(pentafluorophenyl)borate, di(o-tolyl)oxonium tetrakis (pentafluorophenyl)borate, and di(2,6-dimethylphenyl)oxonium tetrakis(pentafluorophenyl) borate; di-substituted sulfonium salts such as: diphenylsulfonium tetrakis(pentafluorophenyl)borate, di(o-tolyl)sulfonium tetrakis(pentafluorophenyl)borate, and bis(2,6-dimethylphenyl)sulfonium tetrakis(pentafluorophenyl) borate.

Preferred silylium salt activating cocatalysts include, but are not limited to, trimethylsilylium tetrakispentafluorophenylborate, triethylsilylium tetrakispentafluoro-phenylborate and ether substituted adducts thereof. Silylium salts have been previously generically disclosed in J. Chem. Soc. Chem. Comm., 1993, 383-384, as well as Lambert, J. B., et al., Organometallics, 1994, 13, 2430-2443. The use of the above silylium salts as activating cocatalysts for addition polymerization catalysts is disclosed in U.S. Pat. No. 5,625,087. Certain complexes of alcohols, mercaptans, silanols, and oximes with tris(pentafluorophenyl)borane are also effective catalyst activators and may be used in embodiments of the invention. Such cocatalysts are disclosed in U.S. Pat. No. 5,296,433.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material.

At all times, the individual ingredients, as well as the catalyst components, should be protected from oxygen and moisture. Therefore, the catalyst components and catalysts should be prepared and recovered in an oxygen and moisture free atmosphere. Preferably, therefore, the reactions are performed in the presence of a dry, inert gas such as, for example, nitrogen or argon.

The molar ratio of metal complex:activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from 1:3:5.

In general, the polymerization may be accomplished at conditions for Ziegler-Natta- or metallocene-type polymerization reactions, that is, reactor pressures ranging from atmospheric to 3500 atmospheres (34.5 kPa). The reactor temperature should be greater than 80° C., typically from 100° C. to 250° C., and preferably from 100° C. to 150° C., with higher reactor temperatures, that is, reactor temperatures greater than 100° C. generally favoring the formation of lower molecular weight polymers.

Generally the polymerization process is carried out with a differential pressure of ethylene of from 10 to 1000 psi (70 to 7000 kPa), most preferably from 40 to 60 psi (300 to 400 kPa). The polymerization is generally conducted at a temperature of from 80 to 250° C., preferably from 90 to 170° C., and most preferably from greater than 95 to 140° C.

In most polymerization reactions the molar ratio of catalyst:polymerizable compounds employed is from $10^{-12}:1$ to $10^{-1}:1$, more preferably from $10^{-9}:1$ to $10^{-5}:1$.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, isopentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The polymerization may be carried out as a batchwise or a continuous polymerization process, with continuous solution polymerizations processes being most preferred for the preparation of the liquid low molecular weight polymers of the invention. In a continuous process, ethylene, comonomer, and optionally solvent and diene are continuously supplied to the reaction zone and polymer product continuously removed therefrom.

The homogeneous, low crystallinity, low viscosity ethylene and/or alpha olefin homopolymers and interpolymers used as the base polymer for the filled compositions of the present invention may be polymerized in a first reactor, with a second polymer (of higher molecular weight and/or of different density, and/or which is heterogeneous) being polymerized in a second reactor which is connected in series or in parallel to that in which the liquid low molecular weight polymer is produced, to prepare in-reactor polymer blends having desirable properties. An example of a dual reactor process which may be adapted in accordance with the teachings of this disclosure to prepare blends wherein at least one component is the homogeneous liquid low molecular weight ethylene/alpha-olefin polymer of this invention, is disclosed in WO 94/00500, (equivalent to U.S. Ser. No. 07/904,770), as well as U.S. Ser. No. 08/010,958, filed Jan. 29, 1993.

The polymer may also be prepared using a dual catalyst system in either a single, dual or multiple reactor configuration as disclosed in copending U.S. patent application Ser. No. 60/504,412 filed on Sep. 19, 2003 in the Teresa Karjala and Brian Kolthammmer.

The homogeneous low crystallinity, low viscosity ethylene and/or alpha olefin homopolymers or interpolymers used as the base polymer for the filled compositions of the present invention may also be blended with one or more other polymers prior to mixing with the additive. Such other blend polymers include but are not limited to, styrene block copolymers, rubbers, linear low density polyethylene (LLDPE), high density polyethylne (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanates, ethylene ethylacrylate polymers (EEA), ethylene styrene interpolymers (ESI), polyurethanes, as well as graft-modified olefin polymers, and combinations of two or more of these polymers.

Filler or Additive Component

Preferred inorganic fillers are ionic inorganic materials. Preferred examples of inorganic fillers are glass fibers, talc, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres or chalk. Of these fillers, barium sulfate, talc, calcium carbonate, silica/glass, glass fibers, alumina and titanium dioxide, and mixtures thereof are preferred. The most preferred inorganic fillers are talc, calcium carbonate, barium sulfate, glass fibers or mixtures thereof.

The filled polymer composition of the present invention may contain one or more organic fillers or additives, for example antioxidants, for example, hindered phenolics (for example, Irganox™ 1010, Irganox™ 1076), phosphites (for example, Irgafos™ 168); light stabilizers, such as hindered amines; plasticizers, such as dioctylphthalate or epoxidized soy bean oil; tackifiers, such as known hydrocarbon tackifiers; waxes, such as polyethylene waxes; processing aids, such as oils, stearic acid or a metal salt thereof; crosslinking agents, such as peroxides or silanes; colorants or pigments, carbon black, graphite, carbon fibers, and blowing agents, to the extent that they do not interfere with desired physical properties of the filled polymer composition of the present invention.

The concentration of filler in the highly filled compositions of the present invention is greater than or equal to 40, preferably greater than or equal to 60, even more preferably greater than or equal to 80 weight percent (based on the combined weights of base resin and filler).

The total percent crystallinity of the base polymer component of the highly filled compositions of the present invention is from 0 to 30, preferably from 3 to 25, more preferably from 5 to 20 percent The viscosity of the base polymer component of the highly filled compositions of the present invention is from 500 to 50,000, preferably from 2,000 to 30,000, more preferably from 5,000 to 20,000 cP at 350° F.

The density of the base polymer component of the highly filled compositions of the present invention will typically be from 0.865 g/cm$^3$ to 0.885 g/cm$^3$.

The highly filled polymer compositions of the present invention can be compounded by any convenient method, such as dry blending of interpolymer(s), the filler(s) and optional additives and subsequently melt mixing, either directly in the extruder used to make the finished article, or by pre-melt mixing in a separate extruder (for example, a Banbury mixer). Dry blends of the compositions can also be directly injection molded without pre-melt mixture.

In another embodiment of the present invention, the highly filled polymer compositions may comprise a broad range of temperature sensitive materials including but not limited to, peroxides, perfumes, and temperature sensitive pigments. The lower melting temperatures and low molecular weights of the polymer component also enables miscibility and compatibility with many temperature sensitive materials. Such combinations are not accessible to carriers of the prior art. For instance, the lower melting point of the instantly claimed polymer compositions are approx. 69° C., allowing masterbatches to be formed with low decomposition temperature peroxides such as Triganox™ 123-C75 (a registered trademark and product of Akzo Nobel) which has the following half-life characteristics: 6 mins at 81° C.; 1 hr at 61° C.; and 10 hr 43° C.

In another embodiment of the present invention the instantly claimed polymer compositions find application in novel die compaction technologies (including warm compaction, agglomerated fine powder compaction and hard material compaction) as well as powder injection molding, cold isostatic pressing, powder extrusion, rapid prototyping, freeform fabrication and green machining. Such applications are enabled as a result of the very low viscosities of the polymer compositions of the present invention, which are still sufficient to avoid powder separation. The range of viscosity allows the loaded polymer to form easily, resulting in consistent mixing and molding conditions. All this produces minimal residual stresses, giving less distortion, and improved dimensional precision.

In another embodiment of the present invention, the instantly claimed polymer compositions find application as a binder and/or carrier of magnetic ferrite filler, for use in magnetic freezer closures, or other articles which carry a magnetic backing including, but not limited to, paper, labels, business cards, etc. with a magnetic backing. Such backings can be applied through a slot-die coater.

In addition to their use as masterbatches, the highly filled polymer compositions of the present invention can be processed directly to fabricated articles by any suitable means known in the art. For example, the filled polymer composition can be processed to films or sheets or to one or more layers of a multilayered structure by know processes, such as calendering, blown film, casting or (co-)extrusion processes. Injection molded, compression molded, extruded or blow molded parts can also be prepared from the filled polymer compositions of the present invention. Alternatively, the filled polymer compositions can be processed to foams or fibers. Useful temperatures for processing the interpolymer(s) in combination with the filler(s) and optional additives to the fabricated articles generally are from 100° C. to 300° C., preferably from 120° C. to 250° C., more preferably from 140° C. to 200° C.

The filled polymer compositions of the present invention can also be extruded onto a substrate. Alternatively the filled polymer compositions of the present invention can be extruded, milled, or calendered as unsupported films or sheets, for example for producing floor tiles, wall tiles, floor sheeting, wall coverings, or ceiling coverings. As such they are particularly useful as sound insulating or energy absorbing layers, films, sheets or boards. Films, sheets or boards of a wide thickness range can be produced. Depending on the intended end-use, useful thicknesses generally are from 0.5 to 20 mm, preferably from 1 to 10 mm. Alternatively, injection molded parts or blow molded articles, such as toys, containers, building and construction materials, automotive components, and other durable goods can be produced from the filled polymer compositions of the present invention.

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis.

EXAMPLES

Unless indicated otherwise, the following testing procedures are to be employed:

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. The sample was poured in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to the required temperature with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, at which final reading is recorded.

The density of the polymers used in the present invention, was measured in accordance with ASTM D-792.

The melt index ($I_2$), was measured in accordance with ASTM D-1238, condition 190° C./2.16 kg (formally known as "Condition (E)").

Percent crystallinity is determined by differential scanning calorimetry using a TA Q1000. The sample was heated to 180° C. and maintained at that temperature for 3 minutes. It was then cooled at 10° C./min to −90° C. It was then heated at 10° C./min to 150° C. The melting temperatures and percent crystallinity are reported from the second heat curve. The percent crystallinity may be calculated with the equation:

$$\text{percent } C = (A/292 \text{ J/g}) \times 100,$$

wherein percent C represents the percent crystallinity, and A represents the heat of fusion of the measured ethylene based polymer in J/g. The melting point, crystallization point and glass transition temperature were also determined by this method.

Blend Components

Blend Component 1 is a homogeneous ethylene/alpha olefin copolymer having a melt index, I2, of 30 g/10 min and a density of 0.870 g/cm³ as measured by ASTM D792 and a melting point as measured by DSC of 65° C. and available from Du Pont Dow Elastomers under the tradename ENGAGE* D8407.

Blend Component 2 is a homogeneous ethylene/octene copolymer having a density of 0.870 g/cm³ as measured by ASTM D792, and a viscosity of 49,000 cP (177° C. (350° F.) as measured by the Brookfield Viscosity Method described herein, and a melting point as measured by DSC of 68° C.

Blend Component 3 is a homogeneous ethylene/octene copolymer having a density of 0.870 g/cm³ as measured by ASTM D792 and a viscosity of 17,000 cP (177° C. (350° F.) as measured by the Brookfield Viscosity Method described herein, and a melting point as measured by DSC of 69° C.

Blend Component 4 is a homogeneous ethylene/octene copolymer having a density of 0.860 g/cm³ as measured by ASTM D792, and a viscosity of 4170 cP (177° C. (350° F.) as measured by the Brookfield Viscosity Method described herein, and a melting point as measured by DSC of 69° C.

Blend Component 5 is a PANTHER* 17FB carbon black (a product and tradename of Engineered Carbons).

EPOLENE C-10P is a wax commercially available from Eastman Chemical and has a viscosity of 4,059 cP @ 177° C. (350° F.) as measured by the Brookfield Viscosity Method described herein, and a melting point as measured by DSC of 93° C.

Examples 1-9

A Werner & Pfleiderer ZSK-53 Twin Screw Extruder (TSE) was used to prepare the filled compositions. A water bath and a pelletizer were used to produce the final product. The composition of the concentrates produced are shown in Table 1 and their processing conditions are summarized in Table 2.

TABLE 1

Formulations for Carbon Black-Filled Compositions

| Blend # | Component 1 (wt. percent) | Component 2 (wt. percent) | Component 3 (wt. percent) | Component 5 (wt. percent) | Barium Stearate (phr) | Irganox 1076 (ppm) | Total Weight (lb) |
|---|---|---|---|---|---|---|---|
| Blend 1 | | 50 | | 50 | 0.05 | 500 | 200 |
| Blend 2 | | | 50 | 50 | 0.05 | 500 | 200 |
| Blend 3 | 50 | | | 50 | 0.05 | 500 | 200 |

TABLE 2

Processability of Carbon Black-Filled Compositions

| Example # | Blend # | percent Torque* | Screw Speed (rpm) | Throughput (lbs/hr) | Melt Temp. (F.) |
|---|---|---|---|---|---|
| 1 | 1 | 28 | 200 | 15 | 436 |
| 2 | 1 | 31 | 250 | 15 | 450 |
| 3 | 1 | 31 | 300 | 15 | 457 |
| 4 | 1 | 35 | 200 | 20 | 468 |
| 5 | 1 | 37 | 250 | 20 | 468 |

TABLE 2-continued

Processability of Carbon Black-Filled Compositions

| Example # | Blend # | percent Torque* | Screw Speed (rpm) | Throughput (lbs/hr) | Melt Temp. (F.) |
|---|---|---|---|---|---|
| 6 | 1 | 34 | 300 | 20 | 502 |
| 7 | 2 | 23 | 200 | 20 | 453 |
| 8 | 2 | 24 | 250 | 20 | 476 |
| 9 | 2 | 24 | 300 | 20 | 466 |
| Comp Ex 1 | 3 | 45 | 200 | 15 | 500 |
| Comp Ex 2 | 3 | 45 | 200 | 15 | 561 |
| Comp Ex 3 | 3 | 45 | 250 | 15 | 576 |

*Actual Torque = (percent Torque/115) * 180

These data show that at the same carbon black loadings, the examples of the present invention processed at lower torque and/or lower melt temperatures than those of the Comparative Examples which comprised a resin of comparable density but of a higher molecular weight (and thus higher viscosity) base polymer.

Example 10

A series of experiments were conducted to determine the maximum filler loading of calcium carbonate ($CaCO_3$) and aluminum trihydrate (ATH) in Blend Component 4 in comparison to that of the prior art polymer, Epolene C-10P. The $CaCO_3$ used was Georgia Marble #9-40 micron and the ATH was Alcoa Hydral Alumina H-710-1 micron. The experiments were conducted in a Haake bowl batch mixer of 69 ml volume. Polymer and filler which had been dry blended were added to a Haake bowl rotating at 30 rpm and preheated to 150° C. The temperature and torque were monitored until steady state had been reached (generally about five minutes of mixing). The resulting mass was recovered, sampled, and used as a heel for a subsequent blend of higher filler loading. A volume bowl fill of 60 percent (42 cc) gave adequate mixing results.

As each blend was made and removed, approximately 5 grams were saved. The remaining material was weighed and returned to the cleaned rotating Haake bowl along with any additional constituents (based on requirements after calculating the components of the heel) to prepare the next higher filled sample. Typically the mass could be removed in pieces and balled into a solid single mass. Occasionally, the resulting blend was flaked or powdered indicating that the blend was not achieved. In this case either additional polymer was added lowering the filler level, or a lower filler blend was started and increments were lowered to 1 or 2 percent increased filler weight. The highest ultimate filler loading was observed visually, that is, the last sample at which the blend would physically hold together and not crumble. These data are summarized in Table 3, and indicate that, in the case of both CaCO3 and ATH as filler, much higher ultimate loadings were observed for the compositions of the present invention relative to those of the prior art.

TABLE 3

Highest Ultimate Loading vs Epolene

|  | Epolene C-10P (4059 cP) | Blend Component 4 (4190 cP) |
|---|---|---|
| CaCO3 | 89 wt percent | 95 wt percent |
| ATH | 77 wt percent | 82 wt percent |

Example 11

The complex viscosity of 2 blends at equivalent calcium carbonate loading (89 wt percent) were measured on a Rheometrics RMS-800 with 25 mm parallel plates at frequencies up to 100 rad/s at 230° C. in a nitrogen purge. The results are summarized in Table 4.

TABLE 4

Processability of $CaCO_3$-Filled Compositions at 89 wt percent $CaCO_3$ Loading

| Frequency (rad/s) | 11 wt Blend Component 4 Viscosity (poise) | 11 wt percent Epolene C-10P Viscosity (poise) | percent Viscosity Difference |
|---|---|---|---|
| 1.58E+00 | 1.98E+05 | 2.02E+05 | 2 |
| 2.51E+00 | 1.22E+05 | 1.33E+05 | 8 |
| 3.98E+00 | 7.64E+04 | 8.88E+04 | 14 |
| 6.31E+00 | 4.81E+04 | 5.90E+04 | 19 |
| 1.00E+01 | 3.03E+04 | 3.90E+04 | 22 |
| 1.59E+01 | 1.98E+04 | 2.72E+04 | 27 |
| 2.51E+01 | 1.30E+04 | 1.94E+04 | 33 |
| 3.98E+01 | 8.92E+03 | 1.44E+04 | 38 |
| 6.31E+01 | 6.26E+03 | 1.08E+04 | 42 |
| 1.00E+02 | 4.39E+03 | 7.95E+03 | 45 |

These results again demonstrate that at the higher processing rates of industrial interest (100 rad/s), the viscosity of the filled composition of Blend Component 4 was 45 percent less than that of the equivalent filled composition of the prior art, again allowing for better much better processability.

What is claimed is:

1. A composition comprising a blend of Component A), Component B) and at least one organic additive;
    A) one or more inorganic fillers, present in an amount greater than, or equal to, 40 percent by weight (based on the combined weights of Component A and B); and
    B) one or more base polymers present in an amount less than 60 percent by weight (based on the combined weights of Component A and B); and
    wherein said one or more base polymers are selected from polypropylene homopolymers, propylene/ethylene copolymers or propylene/C4-C20 alpha-olefin copolymers, and have
    1) a total crystallinity from 0 to 30 percent; and
    2) a Brookfield viscosity from 500 to 50,000 cP, measured at 350° F. (177° C.), and
    wherein the one or more base polymers (Component B) have a density from 0.865 $g/cm^3$ to 0.885 $g/cm^3$.

2. The composition of claim 1, wherein the one or more base polymers are selected from propylene/ethylene copolymers.

3. The composition of claim 1, wherein the one or more base polymers are selected from propylene/C4-C20 alpha-olefin copolymers.

4. The composition of claim 1, wherein
    A) Component A is selected from the group consisting of glass fibers, talc, calcium carbonate, alumina trihydrate, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres, chalk, and combinations thereof.

5. An article comprising at least one component formed from the composition of claim 1.

6. An article comprising at least one component formed from the composition of claim 2.

7. An article comprising at least one component formed from the composition of claim 3.

8. A multilayered structure comprising at least one layer formed from the composition of claim 1.

9. A multilayered structure comprising at least one layer formed from the composition of claim 2.

10. A multilayered structure comprising at least one layer formed from the composition of claim 3.

11. A film or sheet formed from the composition of claim 1.

12. A film or sheet formed from the composition of claim 1.

13. A film or sheet formed from the composition of claim 3.

14. An injection molded or blow molded part formed from the composition of claim 1.

15. An injection molded or blow molded part formed from the composition of claim 1.

16. An injection molded or blow molded part formed from the composition of claim 3.

* * * * *